(12) United States Patent
van der Pol

(10) Patent No.: US 11,110,588 B1
(45) Date of Patent: Sep. 7, 2021

(54) SYSTEM FOR ATTACHING ACCESSORIES TO ONE OR MORE TRESTLES

(71) Applicant: Paul van der Pol, Winter Garden, FL (US)

(72) Inventor: Paul van der Pol, Winter Garden, FL (US)

(*) Notice: Subject to any disclaimer, the term of this patent is extended or adjusted under 35 U.S.C. 154(b) by 465 days.

(21) Appl. No.: 16/046,414

(22) Filed: Jul. 26, 2018

Related U.S. Application Data

(60) Provisional application No. 62/537,035, filed on Jul. 26, 2017.

(51) Int. Cl.
| | |
|---|---|
| *B25H 1/06* | (2006.01) |
| *B25H 1/14* | (2006.01) |
| *F16B 2/06* | (2006.01) |
| *F16M 11/24* | (2006.01) |
| *F16M 11/04* | (2006.01) |
| *F16B 2/10* | (2006.01) |

(52) U.S. Cl.
CPC .............. *B25H 1/06* (2013.01); *B25H 1/14* (2013.01); *F16B 2/065* (2013.01); *F16B 2/10* (2013.01); *F16M 11/045* (2013.01); *F16M 11/24* (2013.01)

(58) Field of Classification Search
CPC ...... B25H 1/00; B25H 1/0021; B25H 1/0042; B25H 1/005; B25H 1/02; B25H 1/04; B25H 1/06; B25H 1/14; B25H 1/16; B25H 1/18; A47B 1/00; A47B 1/02; A47B 1/12; A47B 3/06; F16B 2/065; F16B 2/10
See application file for complete search history.

(56) References Cited

U.S. PATENT DOCUMENTS

| | | | | |
|---|---|---|---|---|
| 4,239,197 A | * | 12/1980 | Olstad .................... | B23Q 1/525 269/68 |
| 4,386,767 A | * | 6/1983 | Dyckes .................... | B25H 1/00 182/129 |
| 6,892,859 B2 | | 5/2005 | van der Pol | |
| 2008/0110529 A1 | * | 5/2008 | Breitenbach ............. | B25H 1/06 144/287 |
| 2016/0377101 A1 | * | 12/2016 | Jiang ....................... | F16B 2/065 24/522 |

FOREIGN PATENT DOCUMENTS

EP           3156191 A1  *   4/2017    ............... B25H 1/04

* cited by examiner

*Primary Examiner* — Tyrone V Hall, Jr.
*Assistant Examiner* — Abbie E Quann
(74) *Attorney, Agent, or Firm* — Stites & Harbison, PLLC; David W. Nagle, Jr.

(57) ABSTRACT

In a system for attaching accessories to one or more trestles, each trestle includes a rail with a saddle secured to the rail, along with a first leg assembly and a second leg assembly that support the rail. A plurality of holes is defined in each saddle, with a threaded insert positioned in each of the plurality of holes. One or more engagement clamps, with each such engagement clamp including a threaded rod passing through one of the plurality of holes in the saddle, are used to attach an accessory to the saddle of each of the one or more trestles.

22 Claims, 17 Drawing Sheets

SYSTEM FOR ATTACHING ACCESSORIES TO ONE OR MORE TRESTLES

CROSS-REFERENCE TO RELATED APPLICATIONS

The present application claims priority to U.S. Patent Application Ser. No. 62/537,035 filed on Jul. 26, 2017, the entire disclosure of which is incorporated herein by reference.

BACKGROUND OF THE INVENTION

The present invention relates to work platforms, and, more particularly, a work platform that has superior safety, stability, and versatility when used on uneven terrain.

Work platforms are used with tools, such as hand tools, power tools, and welding equipment. Commonly used work platforms tend to have a small footprint and, because they are often top-heavy, they are unstable and run the risk of toppling. This limits the type of tools and work practices that can be used with such work platforms. As show in Table A below, various tools apply horizontal force, vertical force, and reciprocal motion to a work platform during use. A vertical force is directed downward, improving stabilization. However, forces in a horizontal direction, compounded by a top-heavy weight distribution, act to destabilize the work platform. Reciprocal motion causes wobble, worsening instability.

TABLE A

| Tool | Vertical Force | Horizontal Force | Reciprocal Motion |
|---|---|---|---|
| Miter Saw | ● | | |
| Drill Press | ● | | |
| Router | | ● | |
| Planer | | ● | |
| Scroll Saw | ● | ● | ● |
| Band Saw | ● | ● | |
| Table Saw | | ● | |
| Disk Sander | | ● | |
| Spindle Sander | ● | ● | ● |
| Lathe | | ● | |
| Bench grinder | | ● | |
| Thickness Planer | | ● | |
| Block Plane | | ● | |
| Scroll Saw | | | |
| Manual Tube Bender | | ● | |
| Chiseling | | ● | |

As reflected in Table A, a miter saw and a drill press are the only tools suitable for portable work platforms because only vertical forces are applied to the work platform. However, in many work practices, such as heavy construction, road building, ship building, and industrial maintenance and repair organizations (MRO), a more versatile range of tools is required. Moreover, these work practices are typically in rough outdoor environments, where uneven terrain is the norm. It is therefore necessary to provide a work platform that remains safe and stable if horizontal forces are applied. Moreover, it is necessary to provide a work platform that remains safe and stable if reciprocal motion is applied. It is also necessary that such a work platform remains stable if used on uneven terrain. Finally, the work platform has to accommodate a wide range of hand and power tools.

U.S. Pat. No. 6,892,859, which is incorporated herein by reference, describes and claims a self-stabilizing trestle that includes independently pivoting leg assemblies, which allow a substantially horizontal support surface defined by the trestle to be maintained stable when the trestle is placed on uneven terrain.

As described in U.S. Pat. No. 6,892,859, an exemplary self-stabilizing trestle is generally comprised of a substantially horizontal crossbeam (or rail) that is supported by first and second leg assemblies. The first leg assembly is pivotally secured to the crossbeam along a first side edge, and the second leg assembly is pivotally secured to the crossbeam along a second side edge. Each leg assembly has a generally tetrahedral structure and is supported by a pair of feet that contact the underlying terrain.

A first hinge operably and pivotally connects the first leg assembly to the crossbeam. This first hinge defines an axis of rotation that is oriented at a predetermined acute angle relative to the support surface defined by the crossbeam. Similarly, a second hinge operably and pivotally connects the second leg assembly to the crossbeam. This second hinge defines an axis of rotation that is also oriented at a predetermined acute angle relative to the support surface defined by the crossbeam. Geometrically, the two rotation axes are preferably substantially coplanar, but not coaxial. The two rotation axes intersect one another either below or above the crossbeam.

As mentioned above, the leg assemblies of the self-stabilizing trestle each have a pair of divergent feet, which are the components of the leg assemblies that actually contact the underlying terrain. The front and rear feet of each leg assembly are spaced apart from one another on opposite sides of the crossbeam. In operation, the self-stabilizing characteristics of a trestle are dependent on the ability of these feet to slip relative the underlying terrain. The slippage of each foot can be quantified in terms of a "slippage ratio," which is the amount of horizontal travel of a foot in the x-direction divided by the amount of vertical travel in the y-direction of that same foot as a leg assembly rotates. More importantly, for purposes of the present discussion, the slippage ratio can be mathematically correlated to the axis orientation angle, the angle at which the axis of rotation of a leg assembly is oriented with respect to the crossbeam.

A trestle constructed in this manner and with appropriately selected axis orientation angles will automatically adjust for placement on uneven terrain, thereby maintaining the stability of the trestle without sacrificing the strength or structural integrity of the trestle. This self-stabilization does not require manual intervention or any form of adjustment. Furthermore, this self-stabilization is not dependent on the distortion or deformation of any of its structural components.

In practice, two such self-stabilizing trestles are often used. For example, FIGS. 2 and 5 illustrate the use of two self-stabilizing trestles 10a, 10b to support a bridge in the form of a tool (or accessory) mount frame 20, as further described below. For another example, FIGS. 6 and 7 illustrate the use of two self-stabilizing trestles 10a, 10b to support a bridge in the form of a welding table 60, as further described below. However, because the trestles 10a, 10b are often placed on uneven terrain, and, indeed, are designed to self-stabilize on uneven terrain, in some cases, the top surfaces of the saddles of the respective trestles will not be co-planar. Furthermore, the larger the footprint, the more the bridge or the work surface is exposed to and affected by the unevenness of the underlying ground. Neither a tool mount frame nor a welding table should be allowed to warp or twist; thus, there is a need for a system that eliminates or substantially minimizes any bending, deformation, or distortion.

SUMMARY OF THE INVENTION

The present invention is a system for attaching accessories to one or more trestles, which provides persons who use hand tools, power tools, and welding equipment a safe, stable, and versatile work platform.

An exemplary system made in accordance is the present invention generally comprises: at least one trestle, including a rail having a first end and a second end, with a saddle secured to the rail, and with a plurality of holes defined in the saddle; a threaded insert positioned in each of the plurality of holes; and one or more engagement clamps, with each such engagement clamp including a threaded rod passing through one of the plurality of holes in the saddle, and into engagement with the threaded insert.

In one exemplary embodiment, the system comprises two trestles, each including a rail to which a saddle is secured. A plurality of holes is defined in each saddle, and a threaded insert is positioned in each of these holes. A tool mount frame (which may also be described or characterized as a "bridge") is attached to the respective saddles of the two trestles. Alternatively, a welding table (which may also be described or characterized as a "bridge") is attached to the respective saddles of the two trestles. In either case, the bridge is secured to the respective saddles of the trestles with one or more engagement clamps. Each engagement clamp includes a threaded rod which passes through the bridge (preferably though a bracket positioned at each corner of the bridge) and into engagement with one of the threaded inserts in one of the holes defined by the saddle.

In some cases, the two saddles of the respective trestles may not be at the exact same orientation relative to the horizon. Therefore, the rims of the holes defined in the respective saddles are not co-planar. Therefore, there is a need for a spacer positioned between one of the saddles and the bridge in at least one corner. Since the unevenness of the ground is never the same, and the gap between the saddle and the bridge is inconsistent and unpredictable, the spacer needs to be variable. Furthermore, when such a variable spacer is used, a two-knob engagement clamp with has a variable clamping length is also used.

An exemplary two-knob engagement clamp for use in the system of the present invention includes a threaded rod. At the top of the threaded rod, a first knob is immovably and permanently affixed; thus, first knob and the threaded rod rotate together as a unit. In the middle is a second knob, which has internal threads that engage the threaded rod; thus, as the second knob is rotated, it moves up or down along the length of the threaded rod. The bottom or distal end of the threaded rod is inserted into and engages one of the threaded inserts in one of the holes defined by the saddle.

An exemplary variable spacer for use in the system of the present invention includes a coarse-step block, a fine-step block, and a raiser block; however, the use of the fine-step block and/or the raiser block is optional. The coarse-step block has a plurality of steps, with each step representing an effective height of the spacer. The coarse-step is positioned between one of the saddles and the bridge in at least one corner. If one of the steps of the coarse-step block fits the gap between the saddle and the bridge properly, then the fine-step block is not needed. If not, however, the fine-step block is configured to engage the coarse-step block to effectively alter the effective height of the spacer. Similarly, if the gap between the bridge and the saddle exceeds the height of the coarse-step block, then a raiser block, which is configured to engage the coarse-step block to effectively increase the effective height of the spacer, is added.

Thus, the system of the present invention is used to ensure that the creation of a rigid and stable work platform, thus allowing for precision work, for example, in a rough outdoor environment.

DETAILED DESCRIPTION OF THE INVENTION

The present invention is a system for attaching accessories to one or more trestles, which provides persons who use hand tools, power tools, and welding equipment a safe, stable, and versatile work platform.

An exemplary system made in accordance is the present invention generally comprises: at least one trestle, including a rail having a first end and a second end, with a saddle secured to the rail, and with a plurality of holes defined in the saddle; a threaded insert positioned in each of the plurality of holes; and one or more engagement clamps, with each such engagement clamp including a threaded rod passing through one of the plurality of holes in the saddle, and into engagement with the threaded insert.

Figure 1:
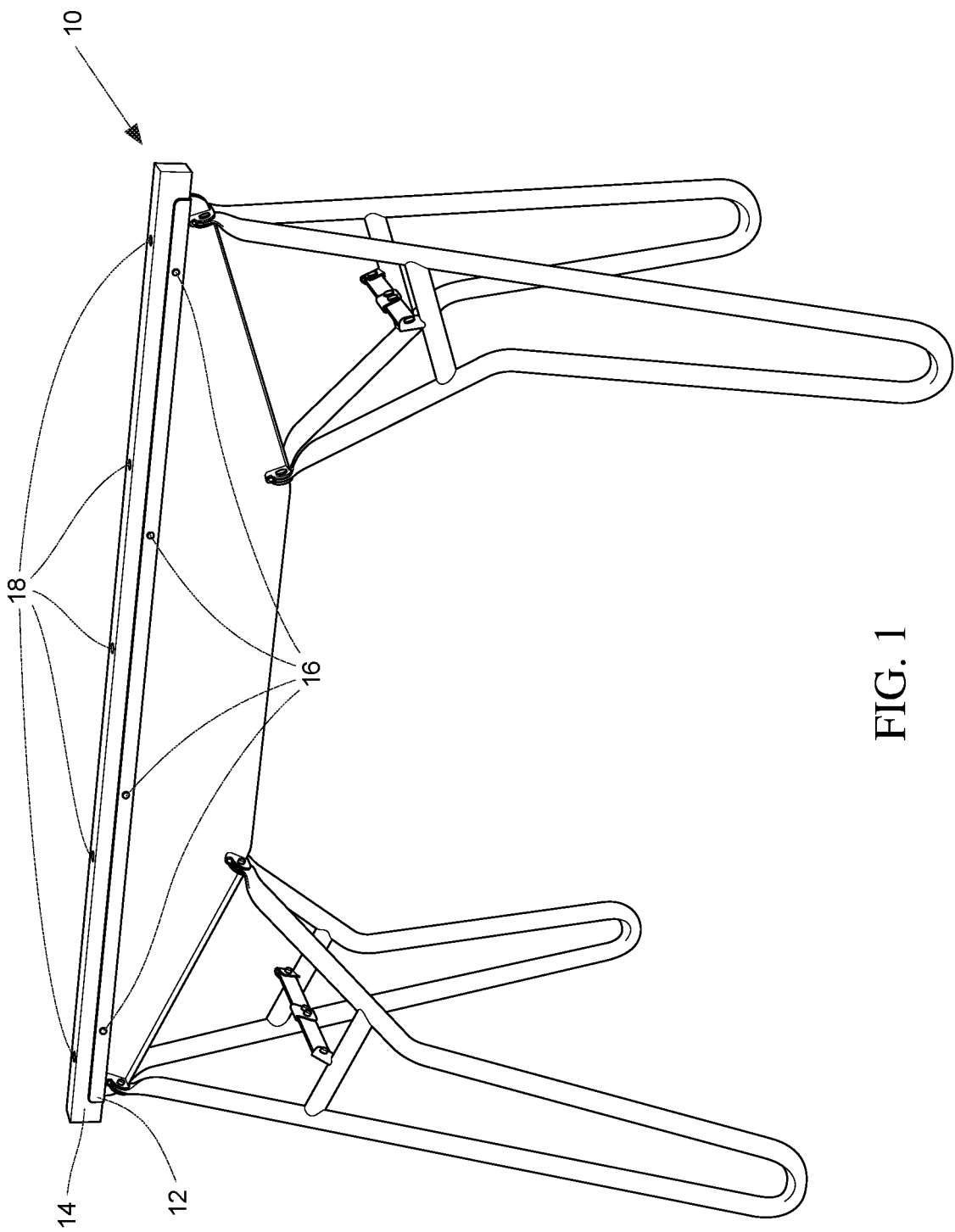
FIG. 1 is a perspective view of a trestle, including a rail to which a saddle is secured.

FIG. 1 is a perspective view of a trestle 10, which, in this case, has a construction as described in U.S. Pat. No. 6,892,859, which again is incorporated herein by reference. Specifically, the trestle 10 includes independently pivoting first and second leg assemblies, which allow a substantially horizontal support surface defined by the trestle 10 to be maintained stable when the trestle 10 is placed on uneven terrain. The trestle 10 includes a rail 12, along with a saddle 14 that is secured to an upper surface of the rail 12. In this regard, the saddle 14 is preferably made of wood and is replaceable, as it is the part that is most often damaged by heavy use. In this exemplary embodiment, the saddle 14 is secured to the rail 12 by screws (or similar fasteners) 16 that pass through the rail 12 and the saddle 14. As also shown in FIG. 1, a plurality of holes 18 is defined in the saddle 14. In this exemplary embodiment, there are five such holes 18, but more or fewer holes could be defined in the saddle 14 without departing from the spirit and scope of the present invention. Furthermore, a threaded insert 88 is positioned in each of these holes 18, as shown, for example, in FIGS. 11 and 12, and as further described below.

Figure 2:
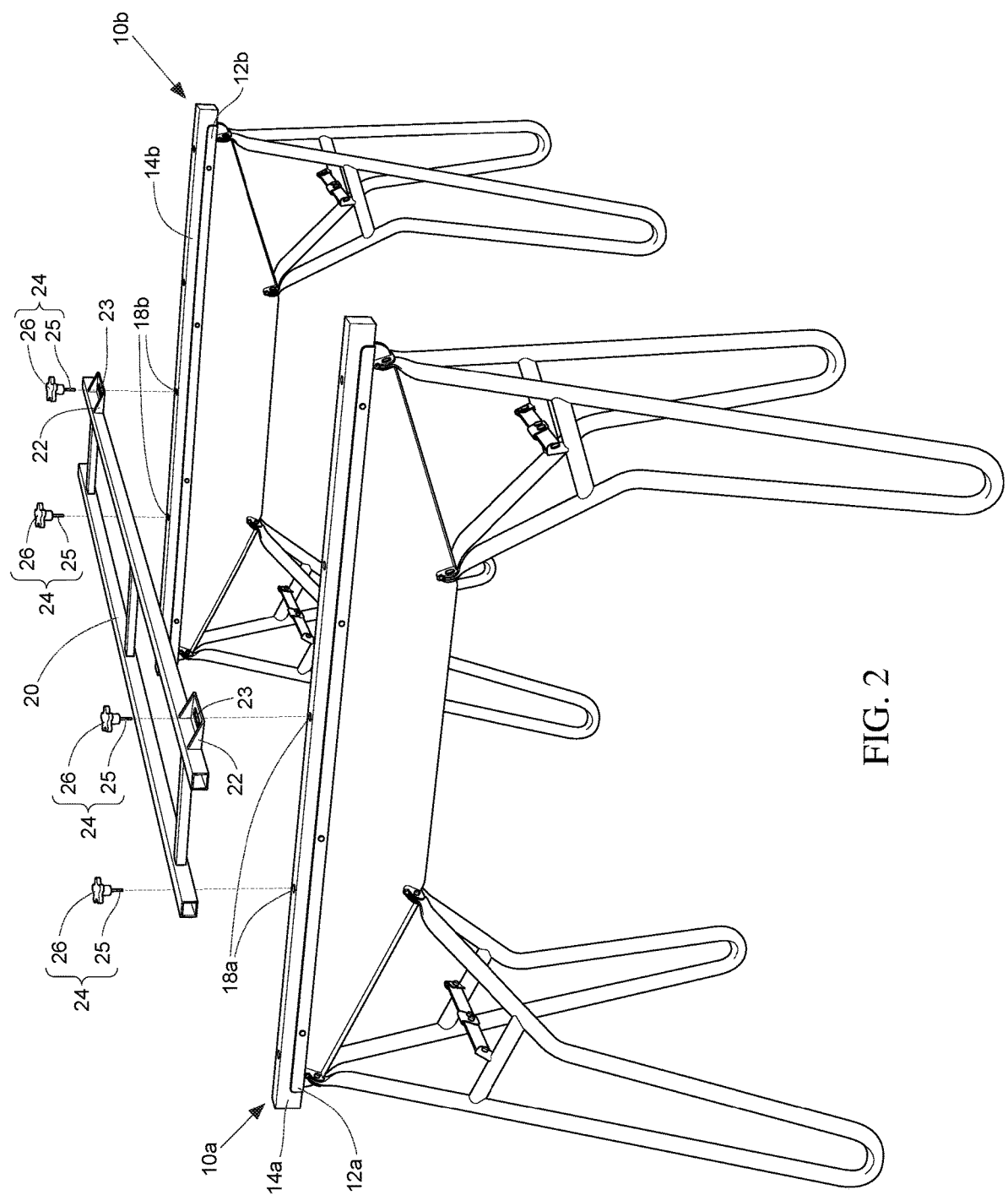
FIG. 2 is a perspective view of an exemplary system made in accordance with the present invention comprising two trestles, each including a rail to which a saddle is secured, with a tool mount frame attached to the respective saddles of the two trestles.

FIG. 2 is a perspective view of an exemplary system made in accordance with the present invention comprising two trestles 10a, 10b, each including a rail 12a, 12b to which a saddle 14a, 14b is secured. A plurality of holes 18a, 18b is defined in each saddle 14a, 14b. A tool mount frame 20 (which may also be described or characterized as a "bridge") is attached to the respective saddles 14a, 14b of the two trestles 10a, 10b. The components of the system thus collectively create the desired work platform.

Referring still to FIG. 2, the tool mount frame 20 includes a substantially identical bracket 22 at each corner (two of which are viewable in FIG. 2), with each bracket 22 defining an opening 23 therethrough. The tool mount frame 20 is attached to the respective saddles 14a, 14b of the two trestles 10a, 10b with one or more engagement clamps 24. Each engagement clamp 24 includes a threaded rod 25 which passes through the opening 23 defined through one of the brackets 22 and into engagement with a threaded insert 88 (shown, for example, in FIGS. 11 and 12) in the corresponding hole 18a, 18b. A knob 26 is mounted to the top of each threaded rod 25 to facilitate rotation of the threaded rod 25 and to apply a clamping force against the upper surface of the bracket 22 of the tool mount frame 20.

At this point, it may be beneficial to review the benefits of this work platform relative to the most commonly used tool stands on the market.

Figure 3:
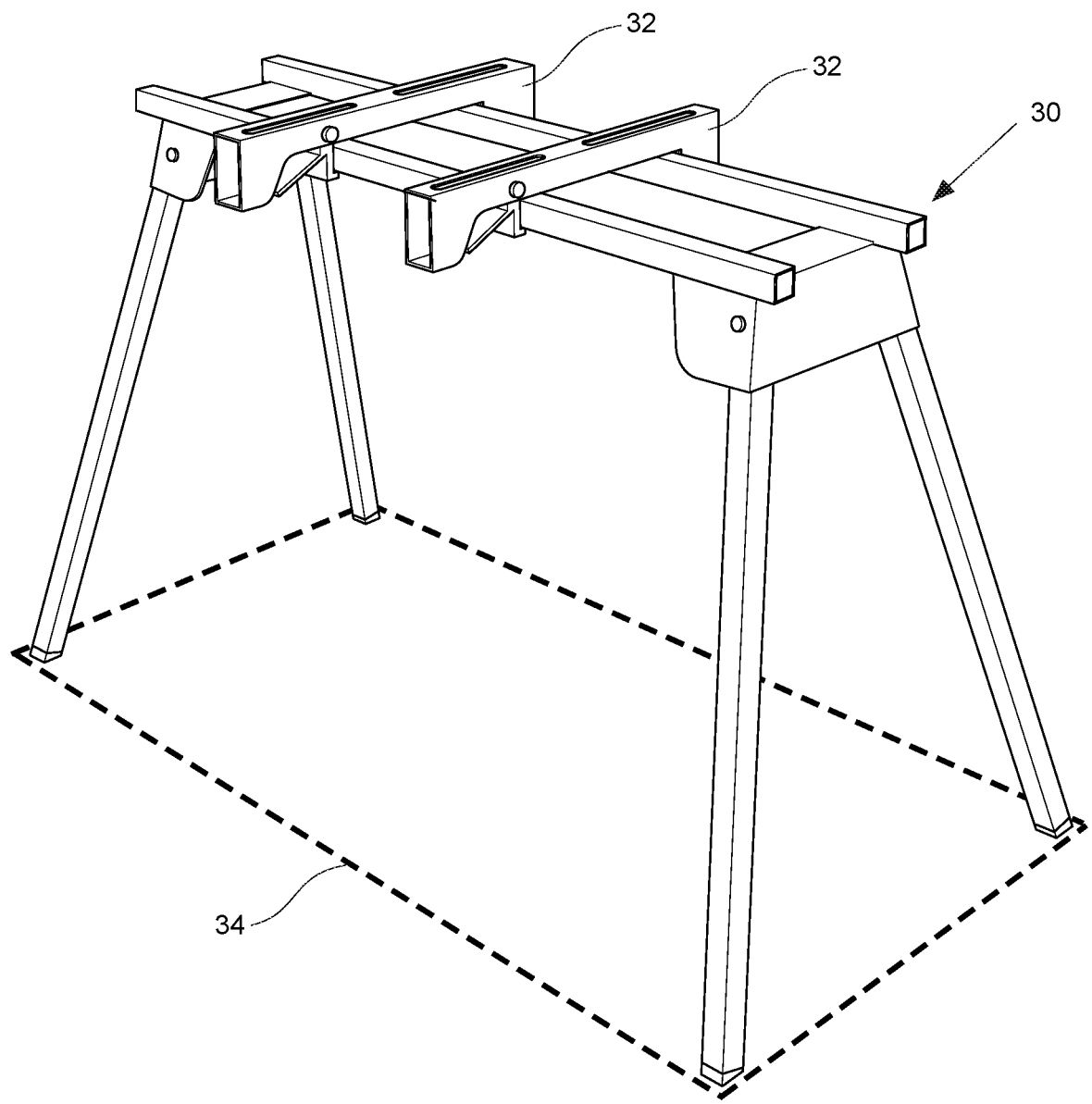
FIG. 3 is a perspective view of a typical miter saw stand, which illustrates its relatively small footprint.

FIG. 3 is a perspective view of a typical miter saw stand 30, which illustrates its relatively small footprint. On top of this miter saw stand 30 are mounts 32 that are configured to receive a miter saw (not shown). In most cases, the footprint 34 is no larger than 26 inches by 58 inches. Because of this small footprint 34, the miter saw stand 30 is only suitable for tools that apply vertical (downward) forces. The small footprint 34 makes this stand unstable for tools that require application of horizontal forces, as described above.

Figure 4:
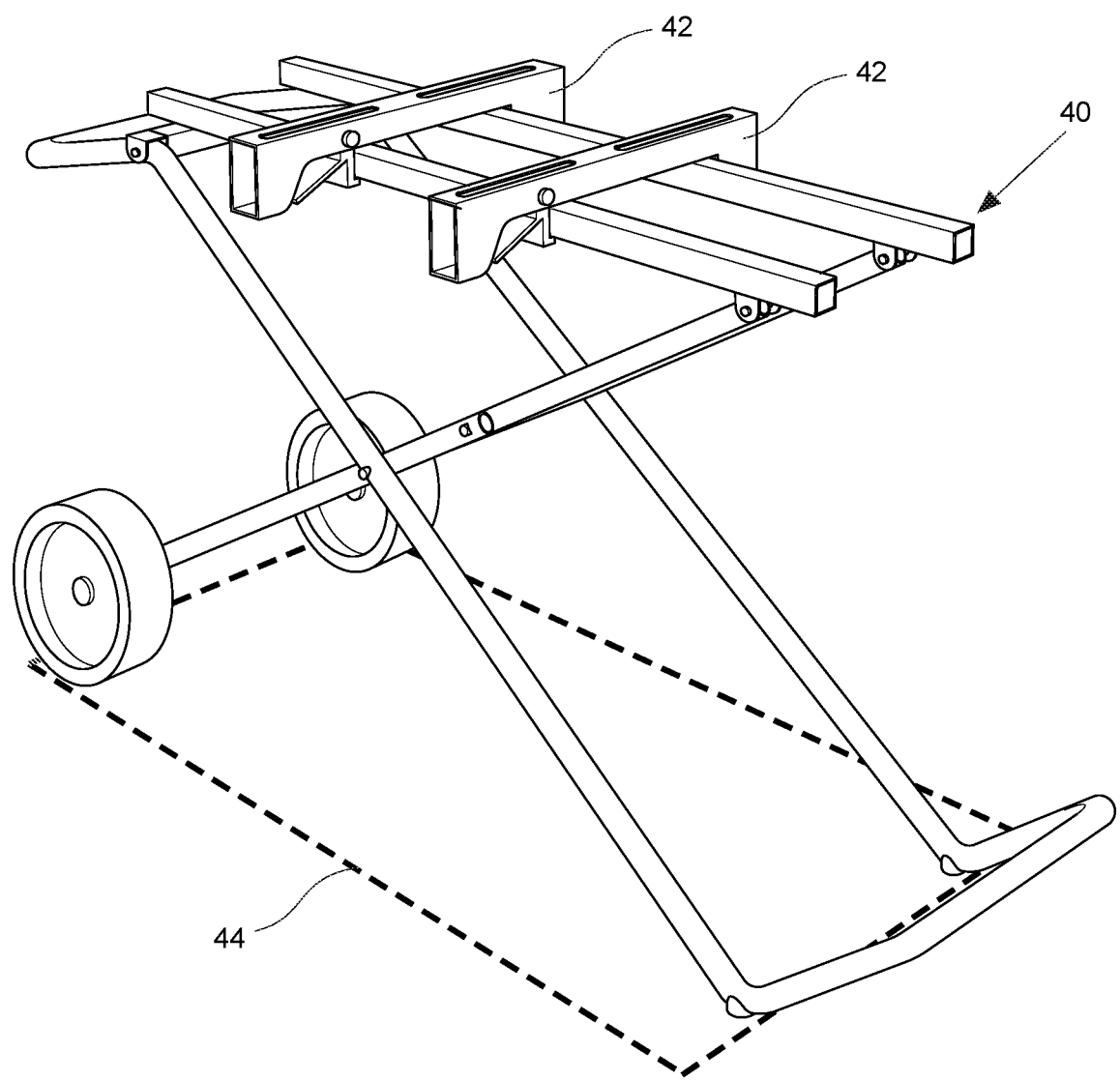
FIG. 4 is a perspective view of a typical rolling miter saw stand, which illustrates its even smaller footprint, as compared to the miter saw stand of FIG. 3.

FIG. 4 is a perspective view of a typical rolling miter saw stand 40, which illustrates its even smaller footprint, as compared to the miter saw stand 30 of FIG. 3. The rolling miter saw stand 40 also includes mounts 42 that are configured to receive a miter saw (not shown). The footprint 44 is even smaller, typically no larger than 24 inches by 52 inches. It is also important to note that the weight of the miter saw is on top of the stand 40; in short, it is top-heavy. The small footprint 44 makes this stand 40 unstable for tools that require application of horizontal forces, as also described above. Horizontal forces and a top-heavy weight distribution could cause this stand 40 to topple.

Figure 5:
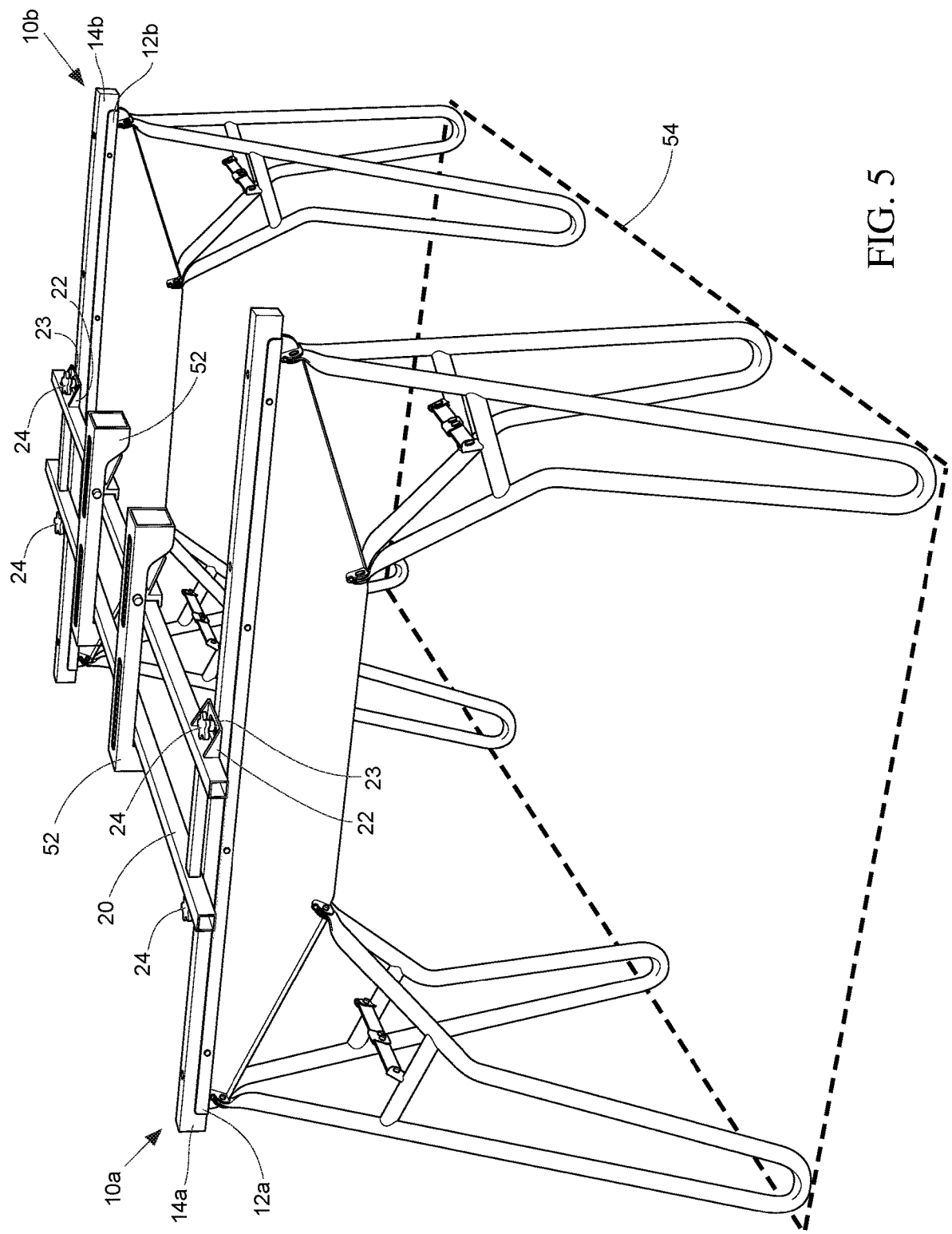
FIG. 5 is a perspective view of an exemplary system made in accordance with the present invention that is substantially identical to that of FIG. 2, comprising two trestles, each including a rail to which a saddle is secured, with a tool mount frame attached to the respective saddles of the two trestles, and further including two tool mounts secured to the tool mount frame.

FIG. 5 is a perspective view of an exemplary system made in accordance with the present invention that is substantially identical to that of FIG. 2. The system comprises two trestles 10a, 10b, each including a rail to 12a, 12b to which a saddle 14a, 14b is secured. A plurality of holes 18a, 18b is defined in each saddle 14a, 14b. A tool mount frame 20 (which may also be described or characterized as a "bridge") is attached to the respective saddles 14a, 14b of the two trestles 10a, 10b. The components of the system thus collectively create the desired work platform. In certain commercial embodiments of this system, the footprint 54 is approximately 48 inches by 68 inches. Therefore, this arrangement is exceedingly stable and suitable for tools that require the application of horizontal forces, making it more versatile. Such tools (not shown) can be attached to one or more tool mounts 52 that are secured to the tool mount frame 20.

Figure 6:
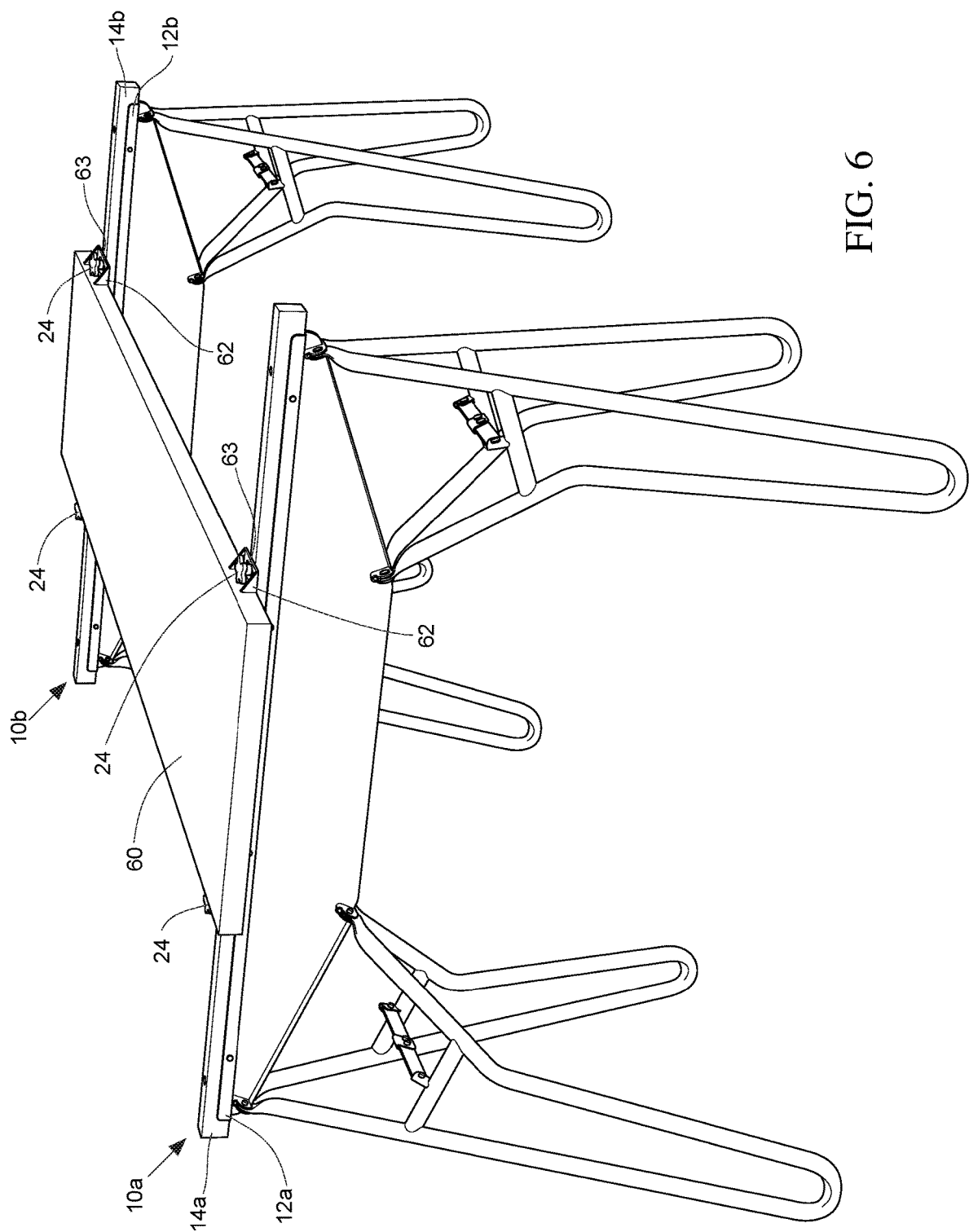
FIG. 6 is a perspective view of an exemplary system made in accordance with the present invention that is substantially similar to that of FIG. 2, comprising two trestles, each including a rail to which a saddle is secured, with a welding table attached to the respective saddles of the two trestles.

FIG. 6 is a perspective view of an exemplary system made in accordance with the present invention substantially similar to that of FIG. 2. The system again comprises two trestles 10a, 10b, each including a rail to 12a, 12b to which a saddle 14a, 14b is secured. In this case, a welding table 60 (which may also be described or characterized as a "bridge") is attached to the respective saddles 14a, 14b of the two trestles 10a, 10b. In this regard, the welding table 60 includes a substantially identical bracket 62 at each corner (two of which are viewable in FIG. 6), with each bracket 62 defining an opening 63 therethrough. The welding table 60 is attached to the respective saddles 14a, 14b of the trestles 10a, 10b with one or more engagement clamps 24. Each engagement clamp 24 again includes a threaded rod 25 which passes through the opening 63 defined through one of the brackets 62 and into engagement with a threaded insert 88 (shown, for example, in FIGS. 11 and 12) in the corresponding hole 18a, 18b. As shown in FIG. 2, a knob 26 is mounted to the top of each threaded rod 25, which again facilitates rotation of the threaded rod 25 and applies a clamping force against the upper surface of the bracket 62 of the welding table 60. In any event, with respect to such use, it is a critical requirement of a welding table 60 that its top surface is flat. Unfortunately, the larger the footprint 54, the more the work platform is exposed to the unevenness of the underlying ground, especially if used in the field (outside). Because of the large footprint 54 (see FIG. 5), it is unlikely that the two saddles 14a, 14b are at the exact same orientation relative to the horizon. Therefore, the rims of the four holes (not visible in FIG. 6) defined in the respective saddles 14a, 14b and corresponding with the four brackets 62 are not co-planar. As a result, if the knobs 26 of the engagement clamps 24 are tightened down against the upper surface of the bracket 62 of the welding table 60, the welding table 60 may twist, which makes precision weldments unfeasible.

Figure 7:
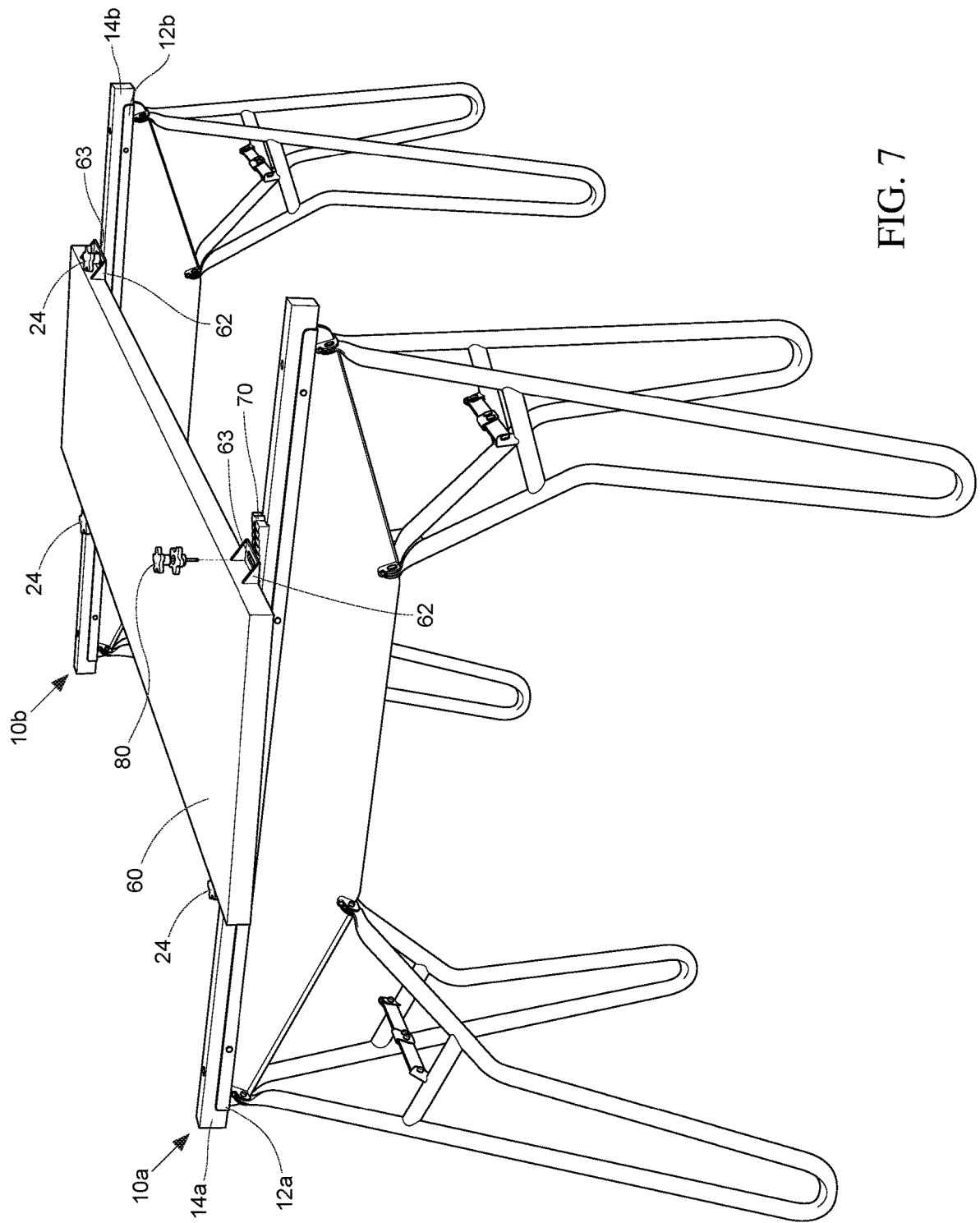
FIG. 7 is a perspective view of the exemplary system of FIG. 6, where the trestles are supporting the welding table on uneven ground.

FIG. 7 is a perspective view of the exemplary system of FIG. 6, where the trestles 10a, 10b are supporting the welding table 60 on uneven ground, causing the saddles 14a, 14b of the respective trestles 10a, 10b not to be in the same orientation relative to the horizon. Thus, the rims of the four holes (not visible in FIG. 7) defined in the respective saddles 14a, 14b and corresponding with the four brackets 62 are not co-planar. Therefore, there is a need for a spacer 70 positioned between one of the saddles 14a and the bracket 62 in at least one corner. Since the unevenness of the ground is never the same, and the gap between the saddle 14a and the bracket 62 is inconsistent and unpredictable, the spacer 70 needs to be variable. Since the threaded rods 25 of the engagement clamps 24 described above and shown in FIG. 2 each have a fixed length, they are not suitable for use with a variable spacer. Therefore, when such a variable spacer 70 is used, the engagement clamp 24 is replaced by a two-knob engagement clamp 80. This two-knob engagement clamp 80 has a variable clamping length to suit the variable spacer 70, as further described below.

Figure 8:
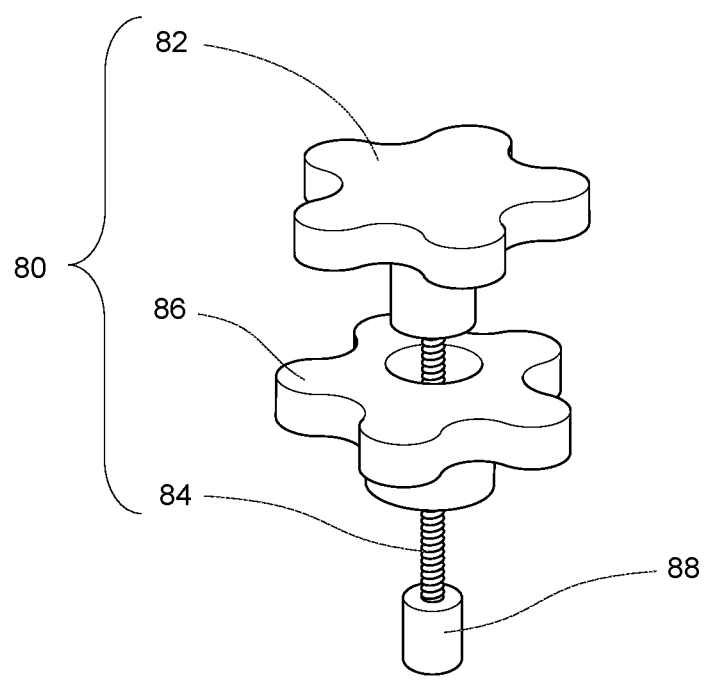
FIG. 8 is a perspective view of an exemplary engagement clamp for use in the system of the present invention.

FIG. 8 is a perspective view of an exemplary two-knob engagement clamp 80 for use in the system of the present invention. The two-knob engagement clamp 80 includes a threaded rod 84. At the top of the threaded rod 84, a first knob 82 is immovably and permanently affixed; thus, first knob 82 and the threaded rod 84 rotate together as a unit. In the middle is a second knob 86, which has internal threads 87 (as shown, for example, in FIGS. 11 and 12) that engage the threaded rod 84; thus, as the second knob 86 is rotated, it moves up or down along the length of the threaded rod 84. The bottom or distal end of the threaded rod 84 is inserted into and engages a threaded insert 88. As described above, the threaded insert 88 is immovably and permanently positioned inside of one of the saddles 14a, 14b, but the threaded insert 88 is shown here in FIG. 8 in order to illustrate the overall construction of the clamp 80. Furthermore, in FIG. 8 (and FIG. 11), the threaded insert 88 has a cylindrical outer shape; however, the outer shape of the threaded insert 88 may take other shapes or forms without departing from the spirit and scope of the present invention. For example, the threaded insert 88 may be a so-called "T-nut."

Figure 9:
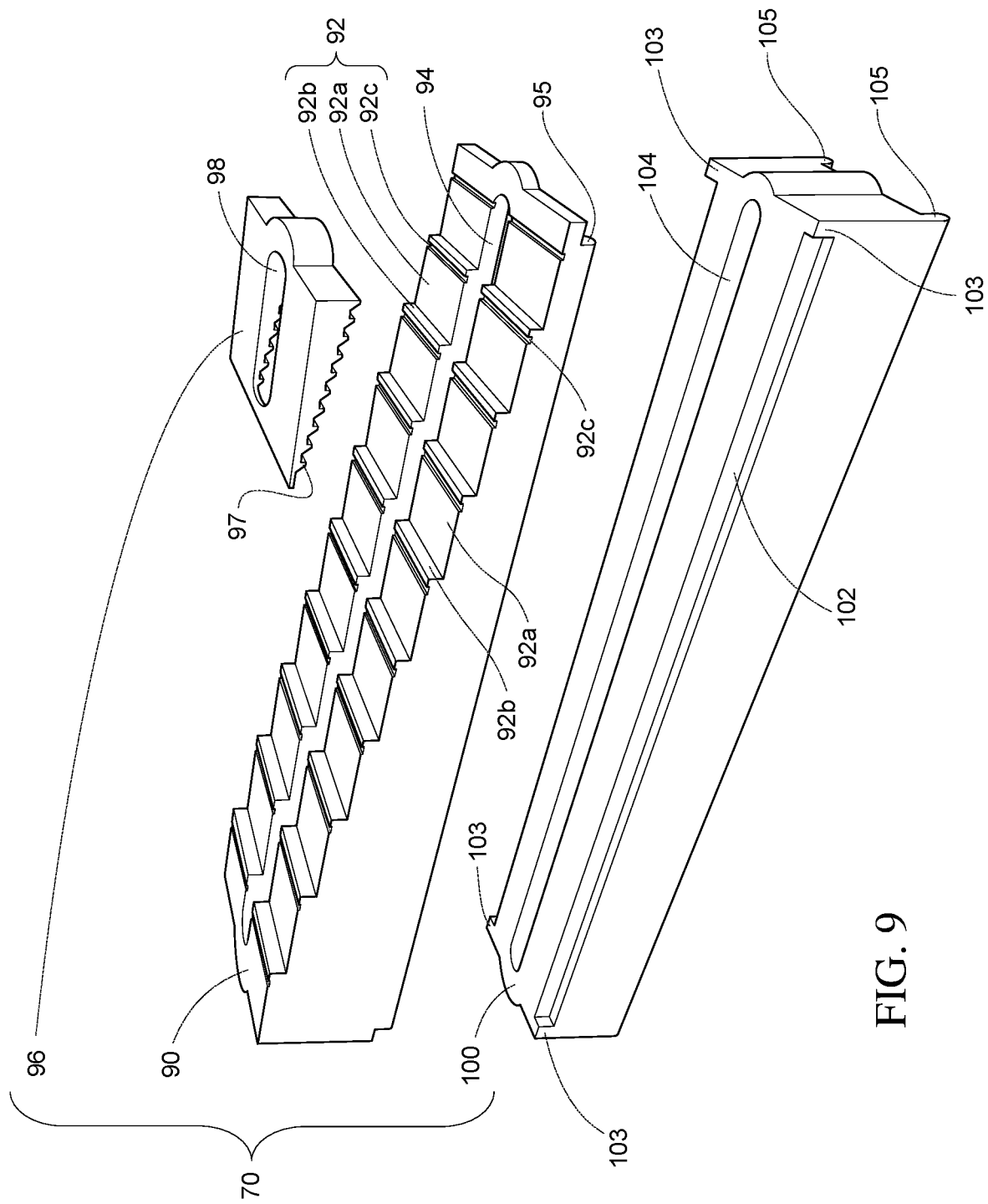
FIG. 9 is an exploded perspective view of an exemplary variable spacer for use in the system of the present invention.

FIG. 9 is an exploded perspective view of an exemplary variable spacer 70 for use in the system of the present invention. As shown, the exemplary variable spacer 70 includes a coarse-step block 90, a fine-step block 96, and a raiser block 100. As will become clearer in the description that follows, the use of the fine-step block 96 and/or the raiser block 100 is optional.

Referring still to FIG. 9, the coarse-step block 90 has a plurality of steps 92, with each step 92 representing an effective height of the spacer 70. Each step 92 can be characterized as including a tread 92a and a riser 92b. The coarse-step block 90 also has a longitudinal slot 94 defined therethrough, such that, in use, the threaded rod 84 of the two-knob engagement clamp 80 (as shown in FIG. 8) will pass through the longitudinal slot 94. Furthermore, in this exemplary embodiment, a groove 92c runs laterally in the tread 92a of each step 92, the importance of which is described below. The coarse-step block 90 also has two downwardly extending flanges 95, one on each side of the coarse-step block 90 (but only one of which is visible in FIG. 9), that extend substantially the length of the coarse-step block 90.

Referring still to FIG. 9, in this exemplary embodiment, if the total height of the coarse-step block 90 is approximately 2 inches, then each step represents an incremental step of approximately 0.2 inches when positioned between one of the saddles 14a and the bracket 62 in one corner, as shown, for example, in FIG. 7. If the riser 92b of one of the steps 92 of the coarse-step block 90 fits the gap between the saddle 14a and the bracket 62 properly, then the fine-step block 96 is not needed. However, if the riser 92b does not fill the gap between the saddle 14a and the bracket 62 suitably, the fine-step block 96 offers smaller rise increments.

Referring again to FIG. 9, the fine-step block 96 has a series of lateral teeth 97 that correspond in distance and pitch with the grooves 92c of the coarse-step block 90. The fine-step block 96 also has a longitudinal slot 98 defined therethrough, such that, in use, the threaded rod 84 of the two-knob engagement clamp 80 (as shown in FIG. 8) will pass through the longitudinal slot 98.

Figure 10A:
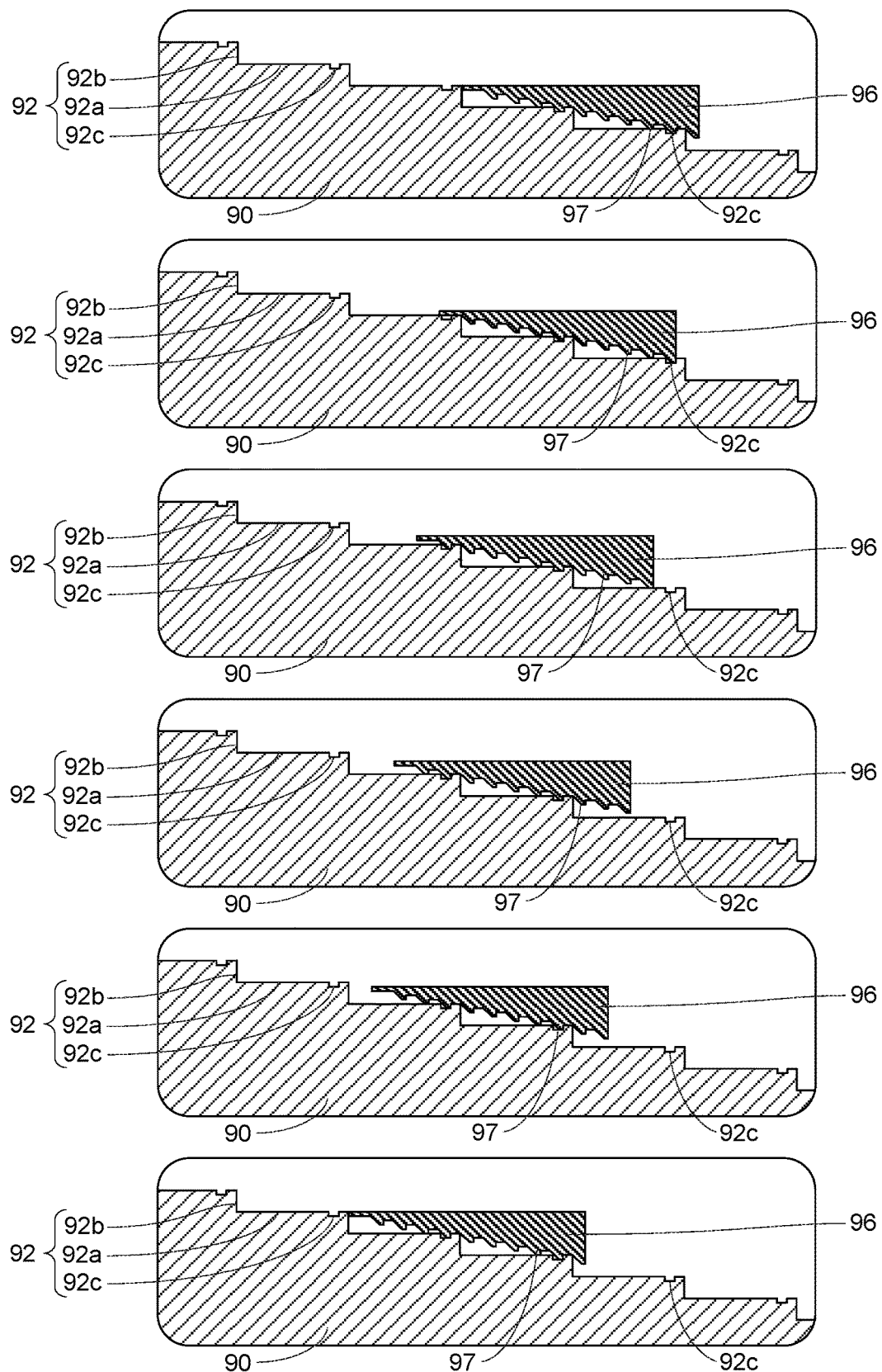
FIG. 10A is a series of sectional views that illustrate the interaction of a coarse-step block and a fine-step block in one exemplary variable spacer for use in the system of the present invention.

FIG. 10A is a series of sectional views that illustrate the interaction of the coarse-step block 90 and the fine-step block 96 in the exemplary variable spacer 70. As described above, a groove 92c runs laterally in the tread 92a of each step 92 of the coarse-step block 90. The fine-step block 96 has a series of lateral teeth 97 that correspond in distance and pitch with the grooves 92c of the coarse-step block 90. In this example, and as shown in FIG. 10A, the fine-step block 96 can engage the coarse-step block 90 in multiple positions between respective steps 92 of the coarse-step block 90, each representing an adjustment of the effective height of the spacer.

Figure 10B:
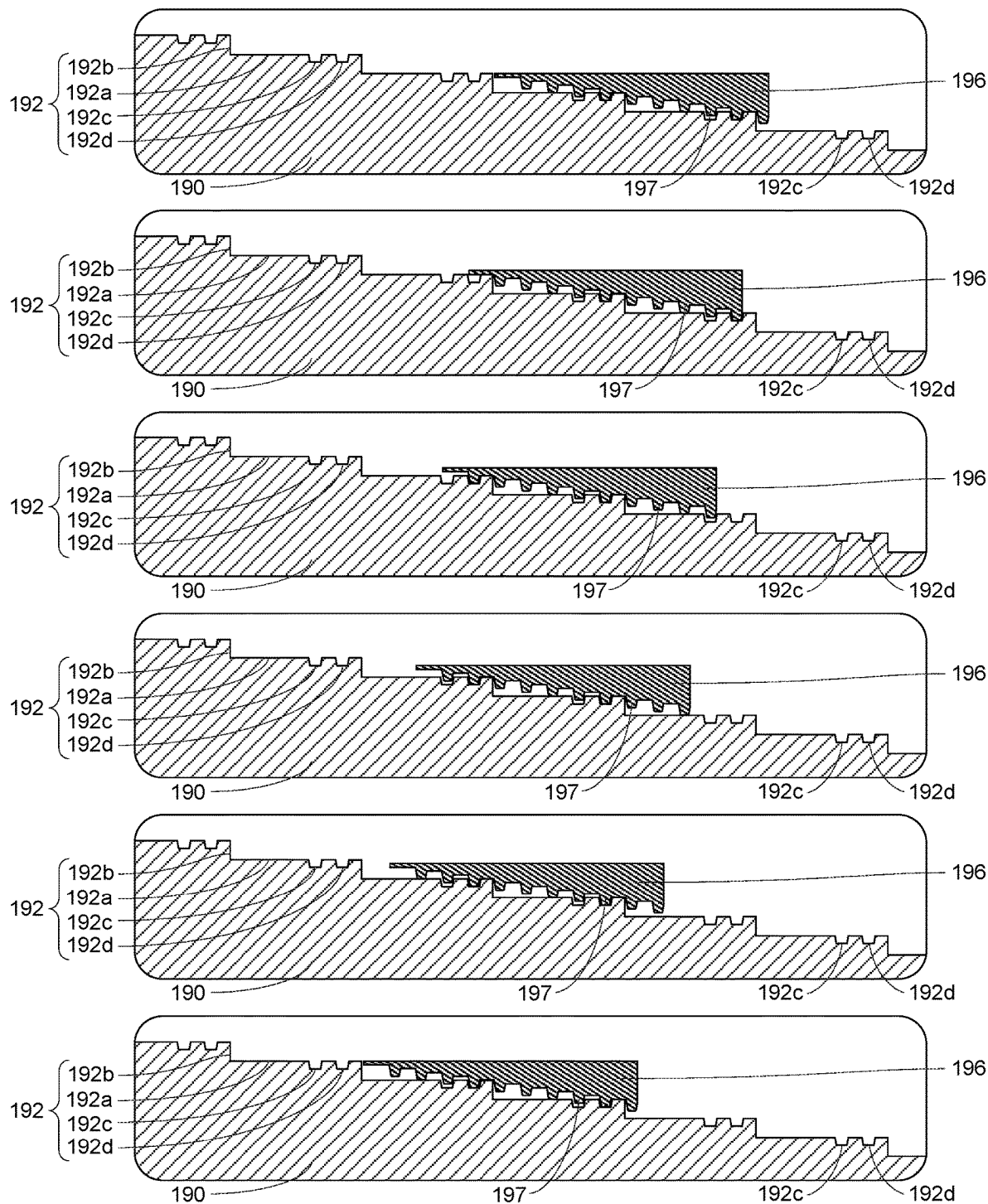
FIG. 10B is a series of sectional views that illustrate the interaction of an alternate coarse-step block and a fine-step block in another exemplary variable spacer for use in the system of the present invention.

FIG. 10B is a series of sectional views that illustrate the interaction of an alternate coarse-step block 190 and a fine-step block 196 in another exemplary variable spacer for use in the system of the present invention. In this alternative, the coarse-step block 190 still has a plurality of steps 192, and each step 192 can be characterized as including a tread 192a and a riser 192b. In this alternative, the coarse-step block 190 and a fine-step block 196 engage and interact in the same way, but the coarse-step block 190 includes two parallel grooves 192c, 192d that run laterally in the tread 192a of each step 192 of the coarse-step block 190. The lateral teeth 197 of the fine-step block 196 engage these grooves 192c, 192d of the coarse-step block 190.

Referring again to FIG. 9, if the gap between the bracket 62 and the saddle 14a exceeds the height of the coarse-step block 90, then a raiser block 100 should be added. The raiser block 100 also has a longitudinal slot 104 defined therethrough, such that, in use, the threaded rod 84 of the two-knob engagement clamp 80 (as shown in FIG. 8) will pass through the longitudinal slot 104. Furthermore, the raiser block 100 has a pair of grooves 102 defined in its top surface (only one of which is visible in FIG. 9), each of which extends substantially the length of the raiser block 100. These grooves 102 receive and engage the corresponding downwardly extending flanges 95 of the coarse-step block 90, so that the coarse-step block 90 and the raiser block 100 can be assembled to one another and function as an integral unit. Furthermore, in this exemplary embodiment, each groove 102 terminates at either end in a bumper 103 (at all four corners); thus, once assembled together, the raiser block 100 cannot slip relative to the coarse-step block 90. And, the raiser block 100 has flanges 105 at the bottom, so that the raiser block 100 does not slip relative to the saddle 14a.

Figure 11:
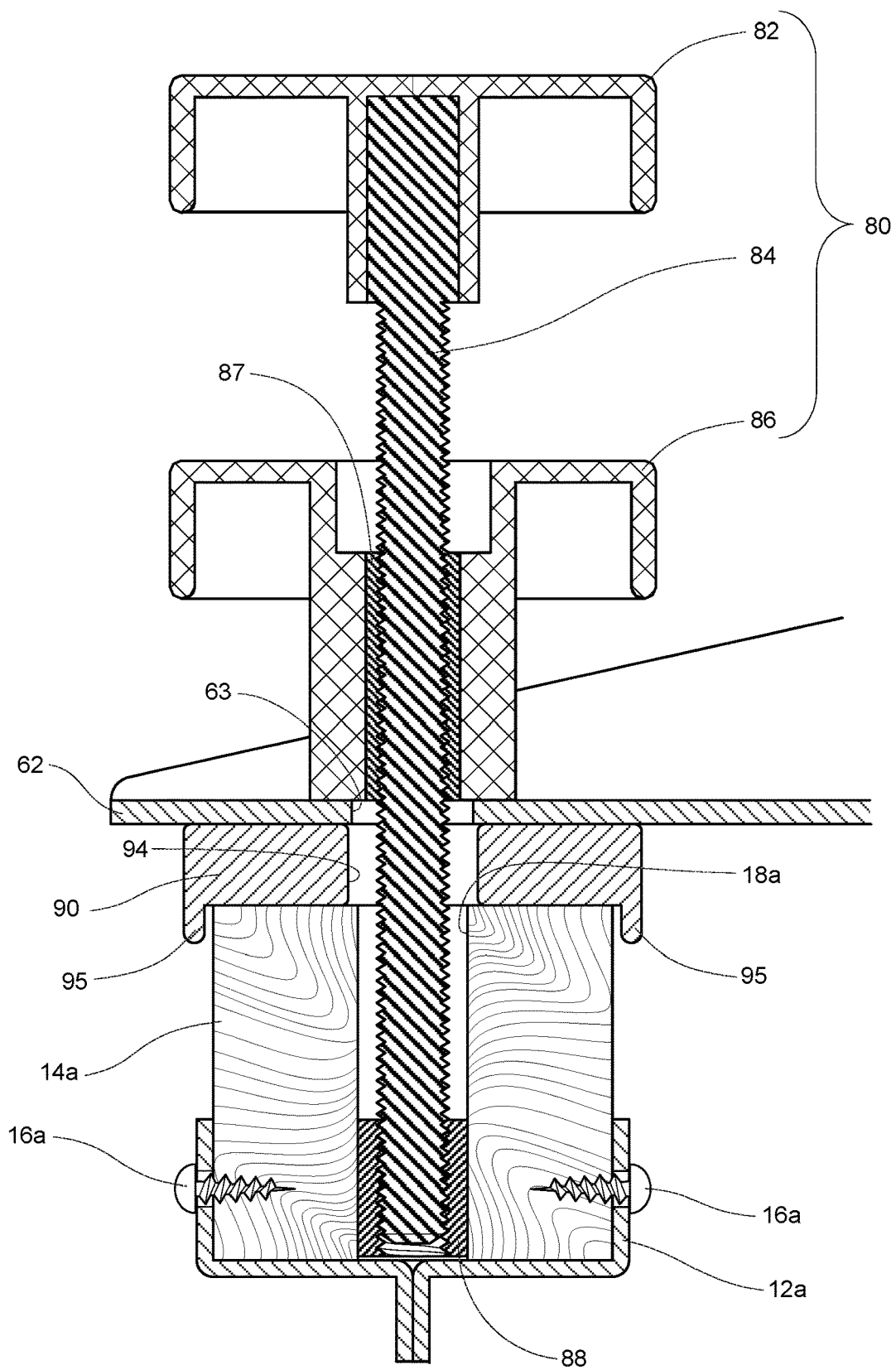
FIG. 11 is a cross-sectional view of the assembly of a threaded insert, a variable spacer (using only a coarse-step block only), a bracket, and an engagement clamp in accordance with the present invention.

For further explanation of the above components, FIG. 11 is a cross-sectional view of the assembly of a threaded insert 88, a variable spacer 70 (using only a coarse-step block 90 only), a bracket 62, and a two-knob engagement clamp 80 in accordance with the present invention to attach the welding table of FIG. 6. As shown, the saddle 14a is secured to the rail 12a by screws (or similar fasteners) 16a that pass through the rail 12a and the saddle 14a. Also, as described above, the threaded insert 88 is immovably and permanently positioned inside the saddle 14a. The bottom or distal end of the threaded rod 84 of the engagement clamp in inserted into and engages the threaded insert 88; thus, there is a first thread engagement between the threaded rod 84 and the threaded insert 88. The second knob 86 of the two-knob engagement clamp 80, which has internal threads 87, also engages the threaded rod 84; thus, there is a second thread engagement between the threaded rod 84 and the internal threads 87 of the second knob 86. As the second knob 86 is rotated, it moves up or down along the length of the threaded rod 84. Accordingly, the second knob 86 can be rotated into position to provide a clamping force against the upper surface of the bracket 62.

Referring still to FIG. 11, the coarse-step block 90 is positioned between the lower surface of the bracket 62 and the saddle 14a. The flanges 95 of the coarse-step block 90 prevent it from slipping laterally relative to the saddle 14a.

Referring still to FIG. 11, as mentioned above, the saddle 14a is the part that is most often damaged by heavy use. For example, if cutting plywood with a circular saw, the saw may cut through the saddle 14a. The top of the saddle 14a is raised relative to the edge of the rail 12a to prevent damage to the circular saw blade or the rail 12a. For the same reason, the threaded insert 88 is preferably recessed in the hole 18a, thus minimizing the likelihood of a tool contacting the threaded insert 88 and causing damage to the tool or the threaded insert 88.

Figure 12:
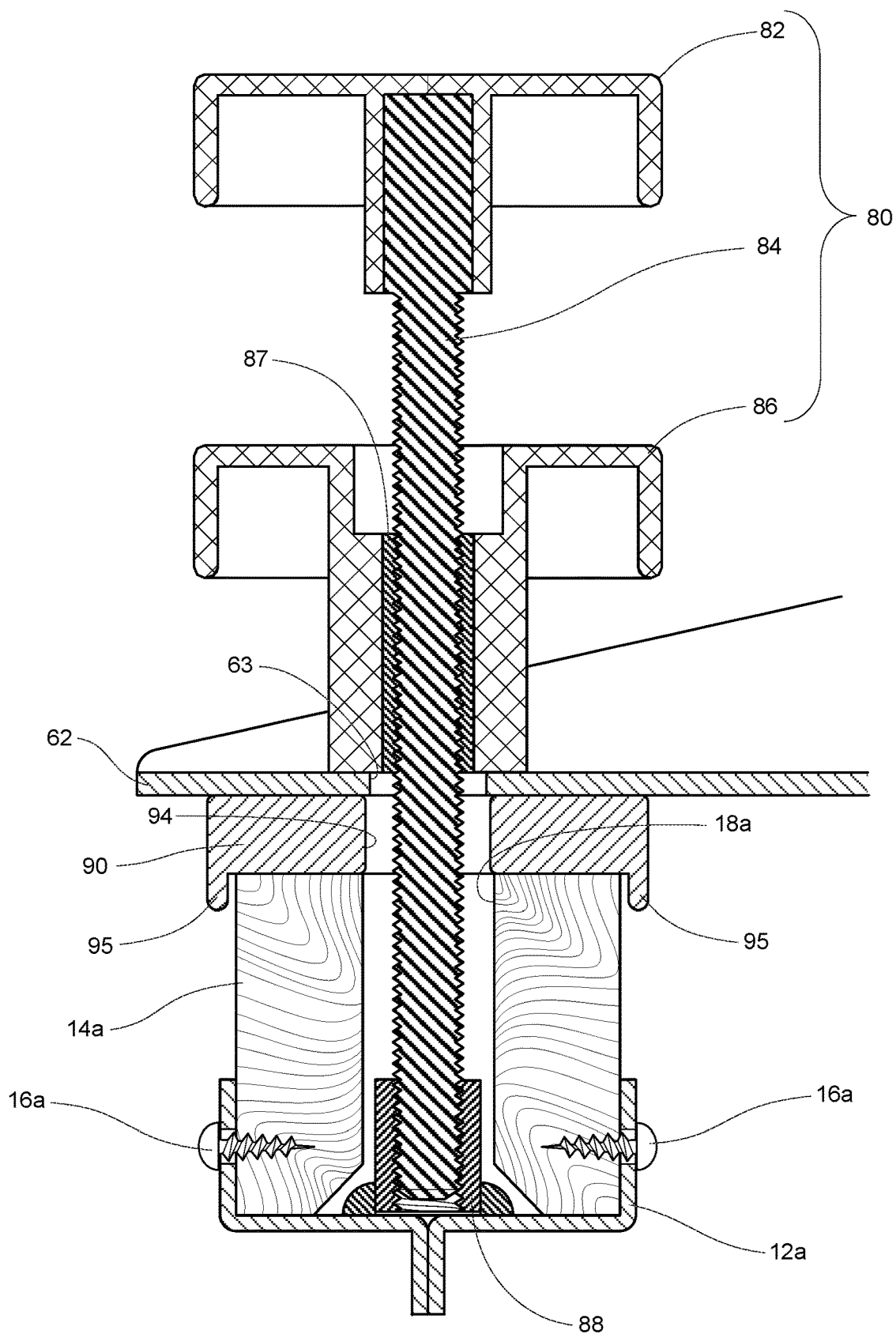
FIG. 12 is a cross-sectional view of another assembly of a threaded insert, a variable spacer (using only a coarse-step block only), a bracket, and an engagement clamp in accordance with the present invention.

FIG. 12 is a cross-sectional view of another assembly of a threaded insert 88, a variable spacer 70 (using only a coarse-step block 90 only), a bracket 62, and a two-knob engagement clamp 80 in accordance with the present invention. The assembly in FIG. 12 is identical to that of FIG. 11, except, that, in FIG. 12, the threaded insert 88 of the assembly is welded to the rail 12a. Furthermore, the diameter of the hole 18a in FIG. 12 is greater than that of the hole 18a of FIG. 11 to accommodate the threaded insert 88 and provide greater manufacturing tolerance.

Figure 13:
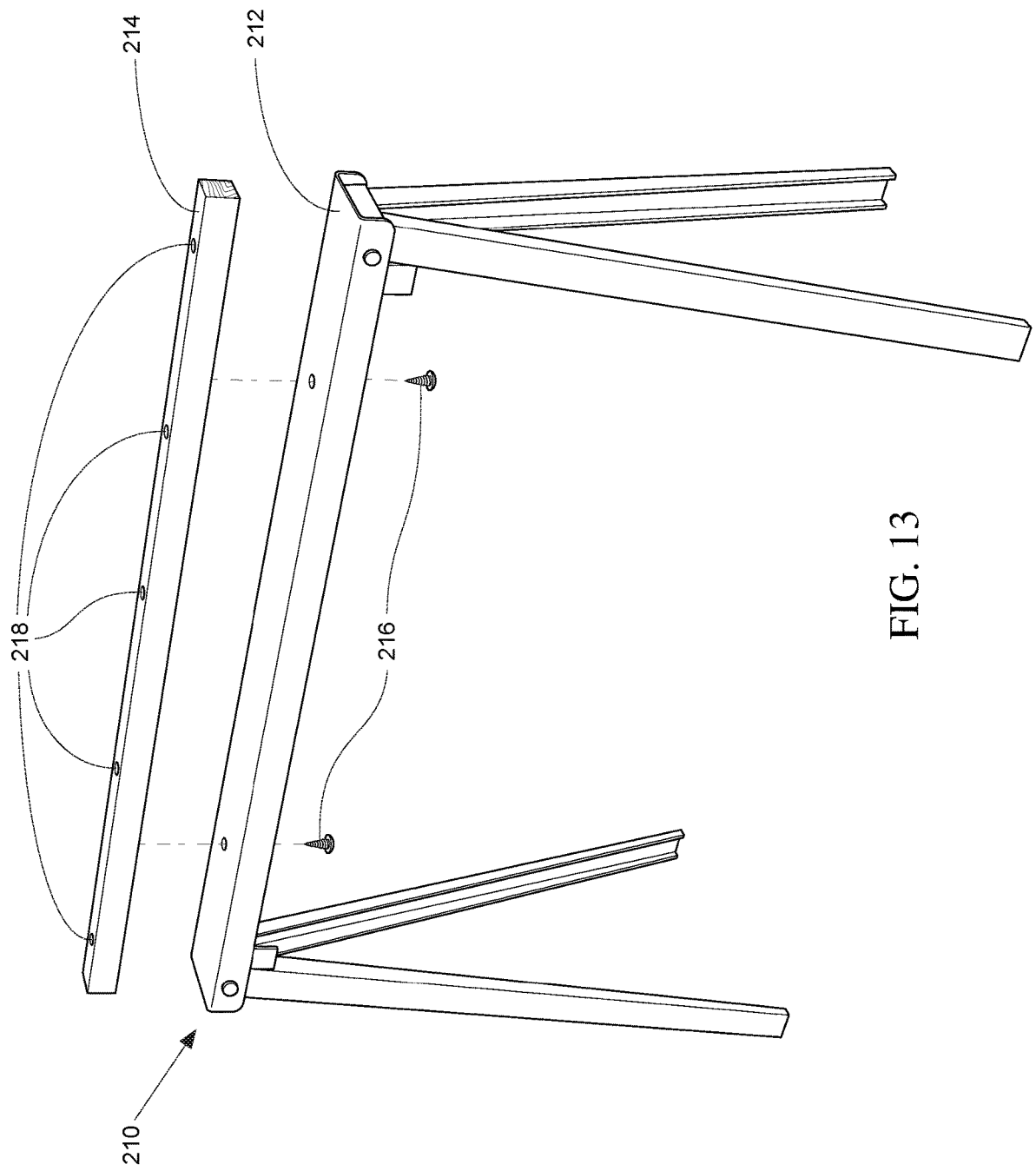
FIG. 13 is an exploded perspective view of a folding sawhorse with an inverted rail to which the saddle is secured.
Figure 14:
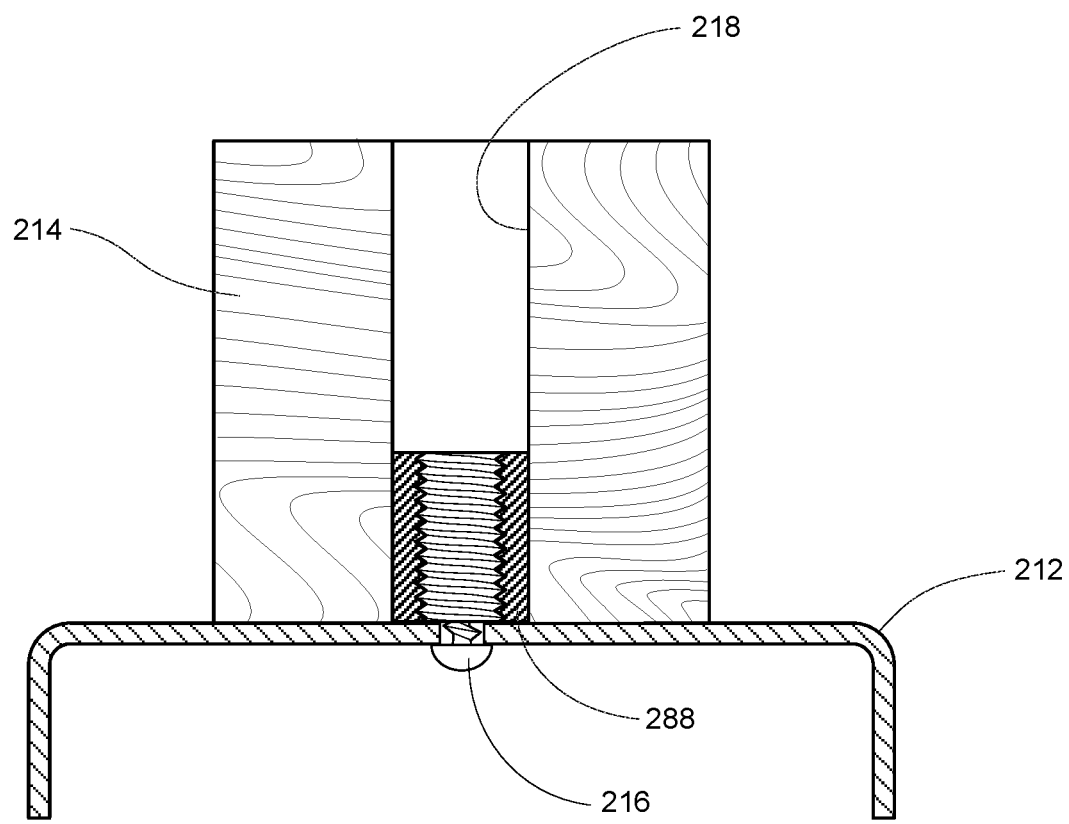
FIG. 14 is a cross-sectional view of the inverted rail and saddle of FIG. 13.

FIG. 13 is an exploded perspective view of a folding sawhorse 210 with an inverted rail 212 to which a saddle 214 is secured, and FIG. 14 is a cross-sectional view of the inverted rail 212 and saddle 214 of FIG. 13. The system of the present invention can still be implemented using such sawhorses 210 in place of the trestles 10 described above with respect to FIGS. 1-12. Specifically, the saddle 214 is secured to the inverted rail 212 of the sawhorse 210 by screws (or similar fasteners) 216 that pass through the bottom of the rail 212 and into the saddle 214. A plurality of holes 218 is defined in the saddle 214, and a threaded insert 288 is positioned in each of these holes 218.

It should also be noted that the two-knob engagement clamp 80 described above could also have separate utility as part of various special-purpose clamps.

Figure 15:
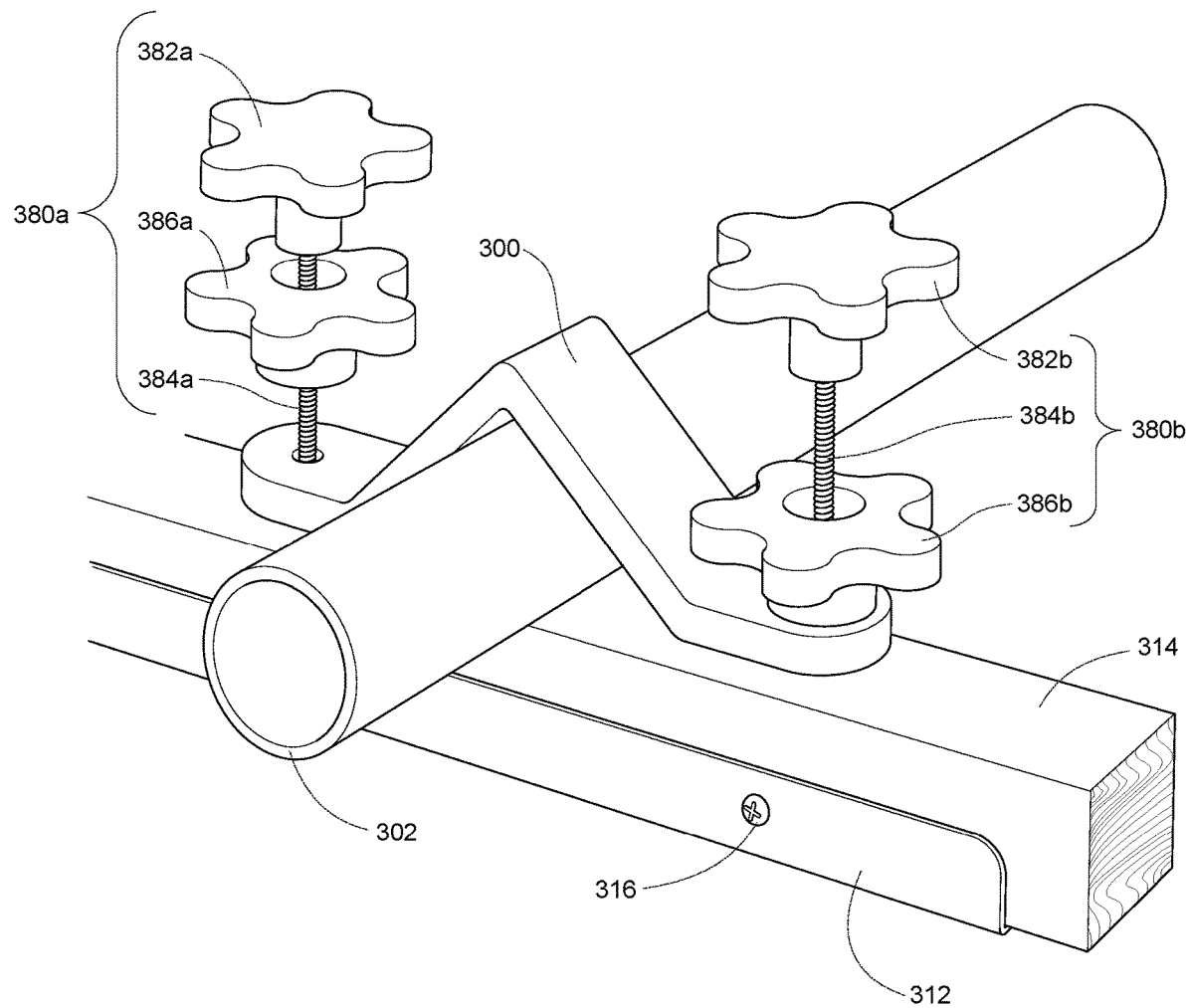
FIG. 15 is a view of two two-knob engagement clamps used with a pipe clamp.

FIG. 15 is a view of two two-knob engagement clamps 380a, 380b used with a pipe clamp 300. Specifically, as shown in FIG. 15, a saddle 314 is secured to an upper surface of a rail 312 of a trestle or sawhorse of some form. Again, the saddle 314 is preferably made of wood and is replaceable, as it is the part that is most often damaged by heavy use. In this exemplary embodiment, the saddle 314 is again secured to the rail 312 by screws (or similar fasteners) 316 that pass through the rail 312 and the saddle 314. Each of the two two-knob engagement clamps 380a, 380b is identical to that described above with respect to FIG. 8, including a first knob 382a, 382b, a threaded rod 384a, 384b, and a second knob 386a, 386b. The bottom or distal end of the threaded rod 384a, 384b is inserted into and engages a threaded insert (not shown) that is immovably and permanently positioned inside of the saddle 314.

Referring still to FIG. 15, a pipe 302 is held in place by the pipe clamp 300 that is attached to the saddle 314 by the two-knob engagement clamps 380a, 380b.

Figure 16:
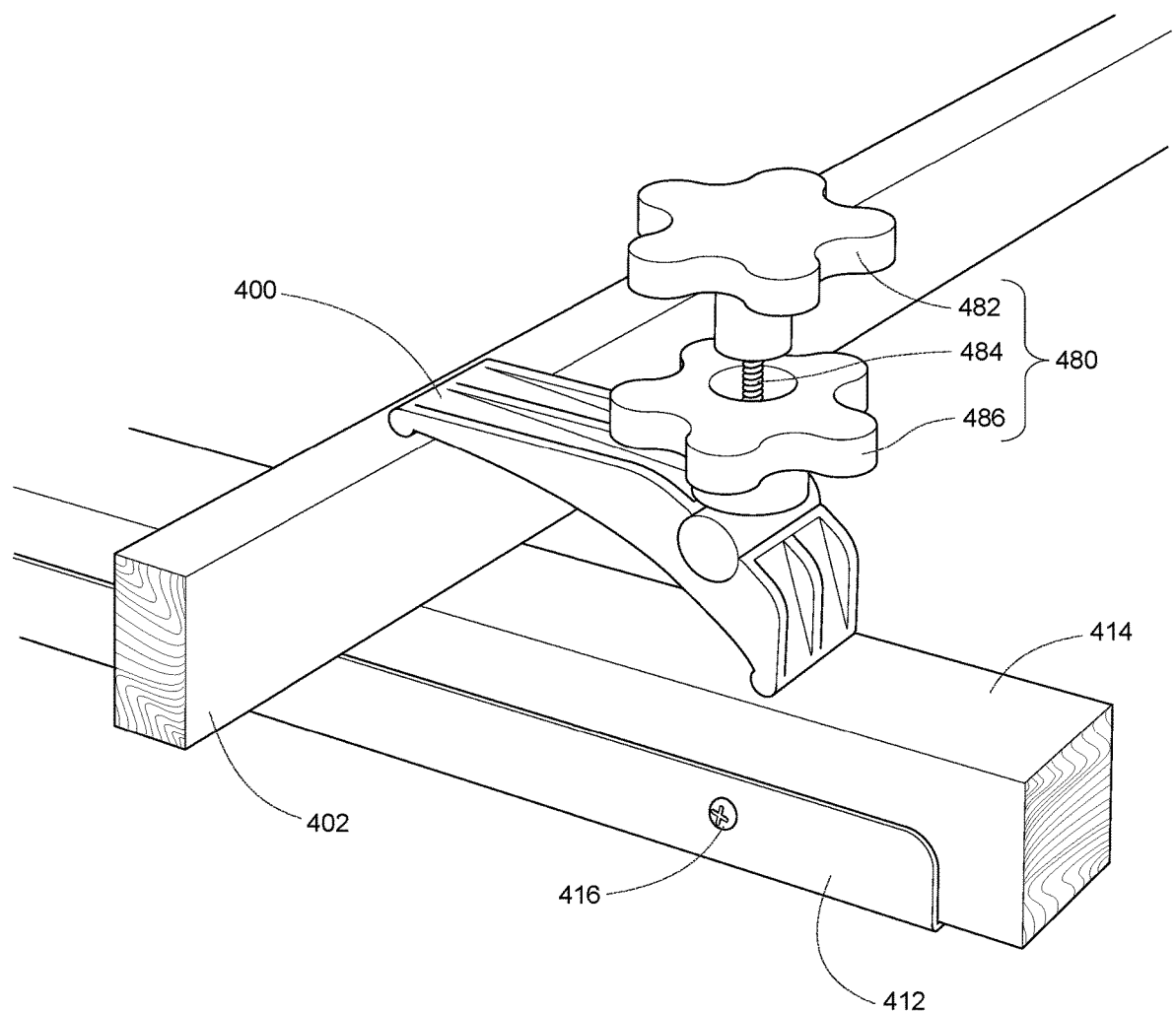
FIG. 16 is a view of a single two-knob engagement clamp used with a pivot clamp.

FIG. 16 is a view of a single two-knob engagement clamp 480 used with a pivot clamp 400. Specifically, as shown in FIG. 16, a saddle 414 is secured to an upper surface of a rail 412 of a trestle or sawhorse of some form. Again, the saddle 414 is preferably made of wood and is replaceable, as it is the part that is most often damaged by heavy use. In this exemplary embodiment, the saddle 414 is again secured to the rail 412 by screws (or similar fasteners) 416 that pass through the rail 412 and the saddle 414. The two-knob engagement clamp 480 is identical to that described above with respect to FIG. 8, including a first knob 482, a threaded rod 484, and a second knob 486. The bottom or distal end of the threaded rod 484 is inserted into and engages a threaded insert (not shown) that is immovably and permanently positioned inside of the saddle 414.

Referring still to FIG. 16, a wood board 402 is held in place by the pivot clamp 400 that is attached to the saddle 414 by the two-knob engagement clamp 480.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system, comprising:
    a trestle, including a rail having a first end and a second end, a saddle secured to the rail, a first leg assembly disposed near the first end of the rail and pivotally secured to the rail, and a second leg assembly disposed near the second end of the rail and pivotally secured to the rail, such that the first leg assembly and the second leg assembly independently pivot relative to the rail;
    wherein a plurality of holes is defined in the saddle of the trestle, with a threaded insert positioned in each of the plurality of holes; and
    one or more engagement clamps, with each such engagement clamp including a threaded rod passing through one of the plurality of holes in the saddle, and into engagement with the threaded insert.

2. The system as recited in claim 1, wherein each threaded insert is recessed in a respective one of the plurality of holes defined in the saddle.

3. The system as recited in claim 1, wherein each of the one or more engagement clamps further includes:
    a first knob affixed to a distal end of the threaded rod, such that the first knob and the threaded rod rotate together; and
    a second knob mounted for rotation relative to the threaded rod, such that the second knob moves along the length of the threaded rod and can be rotated into engagement with a surface.

4. The system as recited in claim 3, wherein the second knob of each of the one or more engagement clamps, upon rotation, creates a clamping action, and wherein the first knob is generally stationary during such rotation.

5. The system as recited in claim 3, and further comprising a pipe clamp that is attached to the saddle of the first trestle by the one or more engagement clamps.

6. The system as recited in claim 3, and further comprising a pivot clamp that is attached to the saddle of the first trestle by the one or more engagement clamps.

7. A system, comprising:
  a first trestle, including a rail having a first end and a second end, a saddle secured to the rail, a first leg assembly disposed near the first end of the rail and pivotally secured to the rail, and a second leg assembly disposed near the second end of the rail and pivotally secured to the rail, such that the first leg assembly and the second leg assembly independently pivot relative to the rail, and wherein a plurality of holes is defined in the saddle of the first trestle, with a threaded insert positioned in each of the plurality of holes;
  a second trestle, including a rail having a first end and a second end, a saddle secured to the rail, a first leg assembly disposed near the first end of the rail and pivotally secured to the rail, and a second leg assembly disposed near the second end of the rail and pivotally secured to the rail, such that the first leg assembly and the second leg assembly independently pivot relative to the rail, and wherein a plurality of holes is defined in the saddle of the second trestle, with a threaded insert positioned in each of the plurality of holes;
  one or more engagement clamps, with each such engagement clamp including a threaded rod passing through one of the plurality of holes in the saddle of the first trestle or the second trestle, and into engagement with the threaded insert; and
  a bridge supported on the saddle of the first trestle and the saddle of the second trestle by the one or more engagement clamps.

8. The system as recited in claim 7, wherein each of the one or more engagement clamps further includes:
  a first knob affixed to a distal end of the threaded rod, such that the first knob and the threaded rod rotate together; and
  a second knob mounted for rotation relative to the threaded rod, such that the second knob moves along the length of the threaded rod and can be rotated into engagement with a surface.

9. The system as recited in claim 8, wherein the second knob of each of the one or more engagement clamps, upon rotation, creates a clamping action, and wherein the first knob is generally stationary during such rotation.

10. The system as recited in claim 7, and further comprising a spacer positioned between the bridge and the saddle of the first trestle or the second trestle.

11. The system as recited in claim 10, wherein the spacer includes a coarse-step block having (a) a plurality of steps, with each of the plurality of steps representing an effective height of the spacer, and (b) a longitudinal slot defined therethrough, such that, in use, the threaded rod of one of the one or more engagement clamps passes through the longitudinal slot.

12. The system as recited in claim 11, wherein the spacer further includes a fine-step block configured to engage the coarse-step block to effectively alter the effective height of the spacer.

13. The system as recited in claim 12, wherein the spacer further includes a raiser block configured to engage the coarse-step block to effectively increase the effective height of the spacer.

14. The system as recited in claim 12, wherein the coarse-step block of the spacer has a series of lateral grooves, and the fine-step block of the spacer has a set of teeth that correspond in distance and pitch with the lateral grooves of the coarse-step block.

15. The system as recited in claim 7, wherein the bridge has four corners, and wherein, in use, said four corners are substantially co-planar.

16. A system, comprising:
  a first trestle, including a rail having a first end and a second end, a saddle secured to the rail, a first leg assembly disposed near the first end of the rail, and a second leg assembly disposed near the second end of the rail, wherein a plurality of holes is defined in the saddle of the first trestle, with a threaded insert positioned in each of the plurality of holes;
  a second trestle, including a rail having a first end and a second end, a saddle secured to the rail, a first leg assembly disposed near the first end of the rail, and a second leg assembly disposed near the second end of the rail, wherein a plurality of holes is defined in the saddle of the second trestle, with a threaded insert positioned in each of the plurality of holes;
  one or more engagement clamps, with each such engagement clamp including a threaded rod passing through one of the plurality of holes in the saddle of the first trestle or the second trestle, and into engagement with the threaded insert;
  a bridge supported on the saddle of the first trestle and the saddle of the second trestle by the one or more engagement clamps; and
  a spacer positioned between the bridge and the saddle of the first trestle or the second trestle;
  wherein the spacer includes a coarse-step block having (a) a plurality of steps, with each of the plurality of steps representing an effective height of the spacer, and (b) a longitudinal slot defined therethrough, such that, in use, the threaded rod of one of the one or more engagement clamps passes through the longitudinal slot.

17. The system as recited in claim 16, wherein the spacer further includes a fine-step block configured to engage the coarse-step block to effectively alter the effective height of the spacer.

18. The system as recited in claim 17, wherein the spacer further includes a raiser block configured to engage the coarse-step block to effectively increase the effective height of the spacer.

19. The system as recited in claim 17, wherein the coarse-step block of the spacer has a series of lateral grooves, and the fine-step block of the spacer has a set of teeth that correspond in distance and pitch with the lateral grooves of the coarse-step block.

20. The system as recited in claim 16, wherein each of the one or more engagement clamps further includes:
  a first knob affixed to a distal end of the threaded rod, such that the first knob and the threaded rod rotate together; and
  a second knob mounted for rotation relative to the threaded rod, such that the second knob moves along the length of the threaded rod and can be rotated into engagement with a surface.

21. The system as recited in claim 20, wherein the second knob of each of the one or more engagement clamps, upon rotation, creates a clamping action, and wherein the first knob is generally stationary during such rotation.

22. The system as recited in claim 16, wherein the bridge has four corners, and wherein, in use, said four corners are substantially co-planar.

\* \* \* \* \*